June 20, 1950 — G. C. MOLOTZAK — 2,512,212
ELECTRICALLY HEATED BELLOWS MOTOR
Filed May 28, 1947 — 2 Sheets-Sheet 1

Inventor
George C. Molotzak

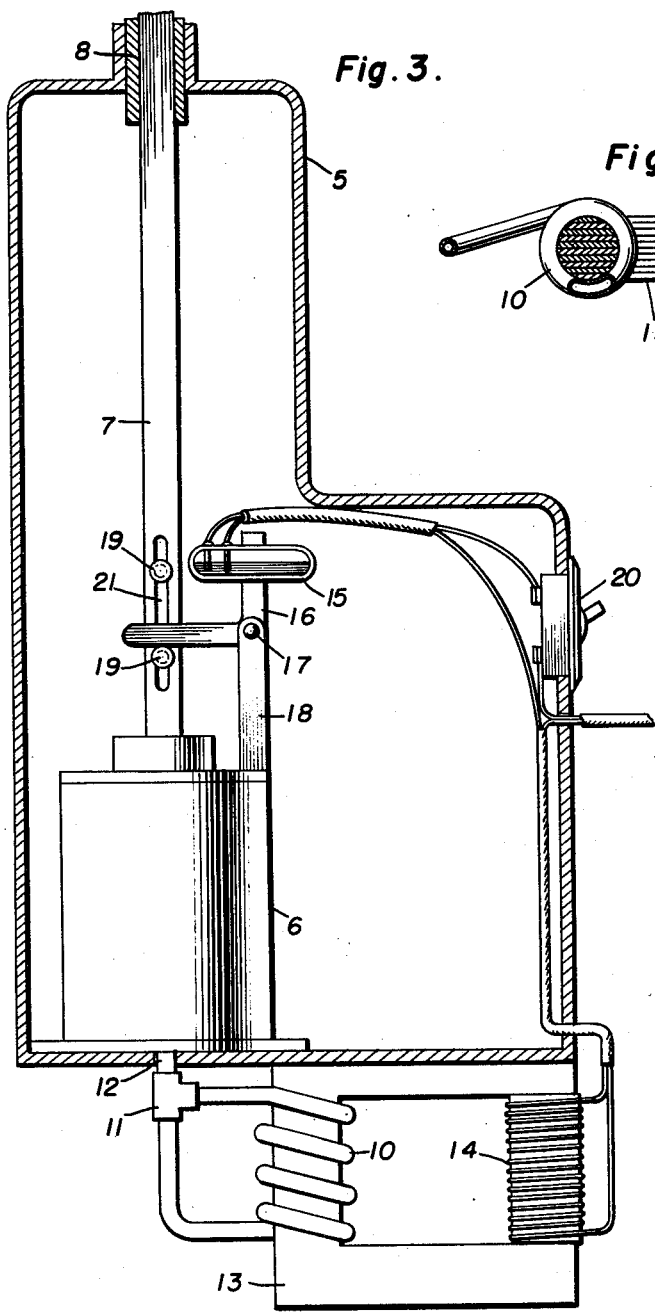
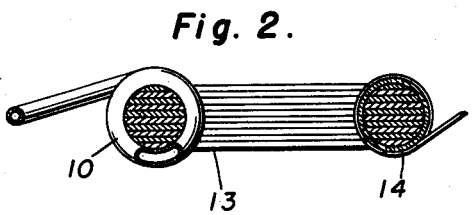
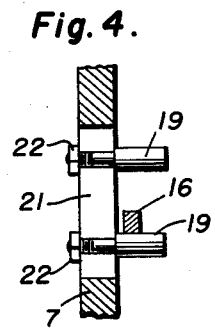

Patented June 20, 1950

2,512,212

UNITED STATES PATENT OFFICE 2,512,212

ELECTRICALLY HEATED BELLOWS MOTOR

George C. Molotzak, Coaldale, Pa.

Application May 28, 1947, Serial No. 751,095

1 Claim. (Cl. 60—23)

This invention relates to an improved heat motor device of the type comprising a closed liquid system including intercommunicating heating and working chambers, a working liquid in said system, electrical heating means for heating the liquid in said heating chamber, and means for intermittently cutting said heating means off and on in response to the heating and cooling of said liquid.

In prior devices of this kind, the heating means has been a heating element in heat-interchanging relation to the heating chamber. An object of my invention, however, is to provide a heating chamber which also constitutes the heating element. In the preferred embodiment, the combined heating chamber and heating element forms the secondary winding of a transformer in which current is induced from the primary winding of the transformer, and means is provided for intermittently cutting the primary winding off and on in response to the heating and cooling of the liquid in the system.

A more specific object of the invention is to provide a heat motor device of the above kind which is comparatively simple in construction, efficient in operation, and otherwise well adapted to meet with the requirements for successful commercial use.

The exact nature of the present invention, as well as more specific objects and features thereof, will become apparent from the following description when considered in connection with the accompanying drawing, in which:

Figure 2 is a horizontal section taken on line 2—2 of Figure 1;

Figure 3 is a view similar to Figure 1, showing a modification; and

Figure 4 is a sectional detail view taken on line 4—4 of Figure 1.

Figure 1:
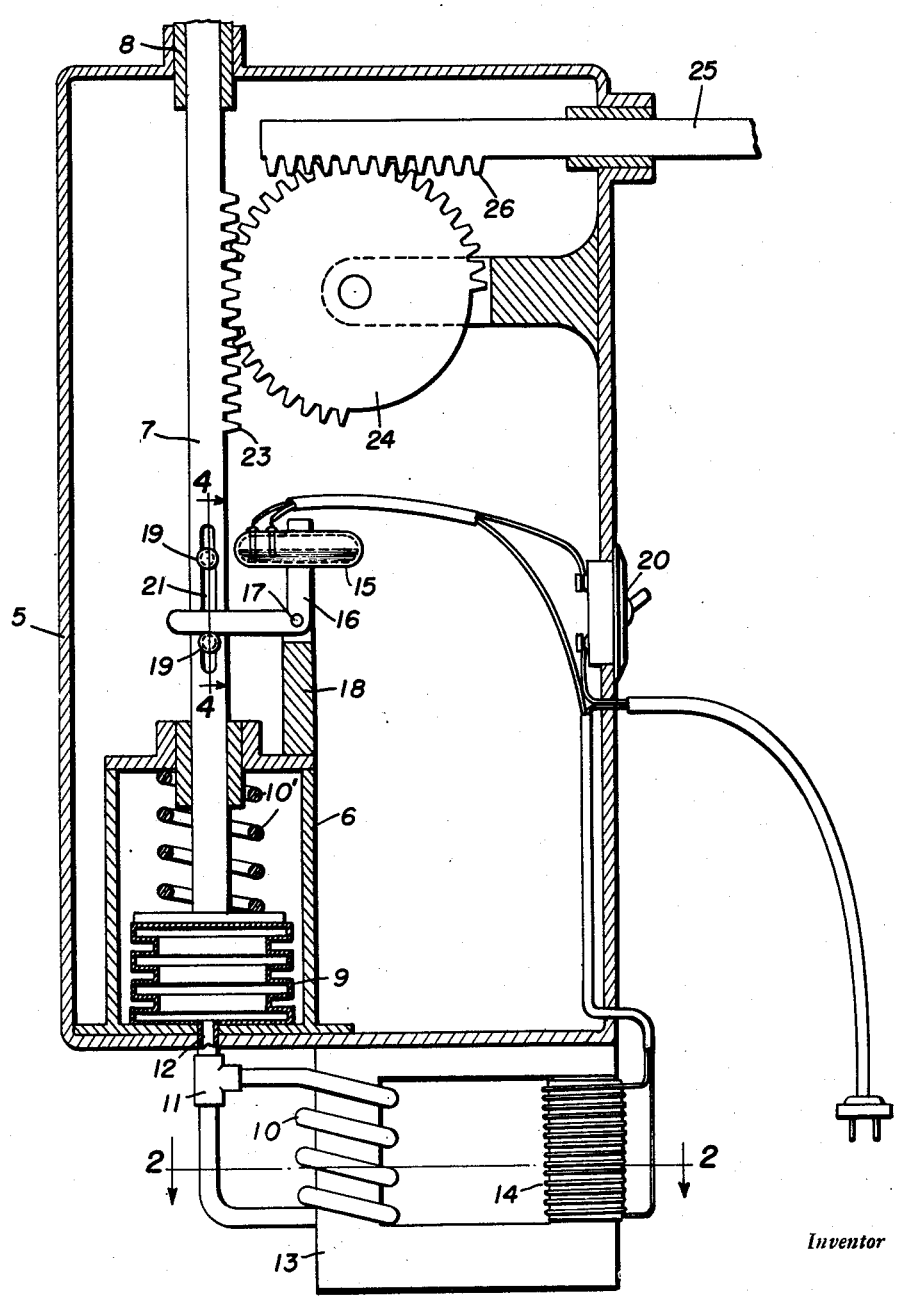
Figure 1 is a vertical sectional view of a heat motor embodying the present invention.

Referring in detail to the drawings, 5 indicates a suitable casing within and upon the bottom of which is mounted a housing 6 through the top of which slidably extends a vertical rod or work-performing element 7 which may also slidably project through the top of the casing 5, as at 8.

The invention includes a closed liquid system which is shown as embodying a fluid pressure motor in the form of a metallic bellows 9 mounted within the housing 6 and having the lower end of the rod or element 7 attached thereto. A spring 10 is provided in the housing 6 about the lower portion of rod 7 and interposed between the top of bellows 9 and the top of housing 6 for normally yieldingly collapsing the bellows 9. The liquid system further includes a hollow heating coil 10 having its ends connected in communication with each other, as at 11, and with the interior of bellows 9, as at 12. The coil 10 is made of electrical conducting material, such as copper, and it constitutes the secondary winding of a transformer having a laminated core 13 and a primary winding 14. The circuit of the primary winding 14 is controlled by a switch so as to be intermittently cut off and on in response to the heating and cooling of the liquid in the system composed of elements 9 to 12, inclusive. As shown, a mercury switch element 15 is carried by one arm of a bell crank lever 16 pivotally mounted at 17 upon a bracket 18 mounted on top of the housing 6, the other arm of lever 16 being extended between spaced pins 19 carried by and projecting laterally from the rod 7. The arrangement is such that when rod 7 moves upwardly, the lower pin 19 will actuate lever 16 so as to tilt switch element 15 and open the circuit of primary winding 14. Also, when the rod 7 lowers, the upper pin 19 will engage lever 16 and move switch element 15 so as to close the circuit of coil 14. When the fluid in the system is heated, bellows 9 is expanded to cause the upward movement of rod 7, and when the liquid in the system cools, rod 7 is lowered by spring 10'. Rod 7 is suitably connected to the device to be operated, and the pins 19 are adjustable longitudinally of rod 7 toward or away from each other to predetermine the amount of movement of rod 7 which is necessary to cause actuation of switch element 15. Naturally, this predetermines the length of stroke of rod 7.

The circuit of primary winding 14 is also preferably controlled by a manually operable switch 20 mounted in one wall of casing 5, so that the motor may be rendered inoperative whenever the same is not required for use.

In operation, the parts will be positioned as shown under normal temperature conditions so that the circuit of primary winding 14 is closed. Current is induced from winding 14 into coil 10, and the induced current causes heating of coil 10 due to the fact that the same is short circuited. This heats the liquid in coil 10 and causes such liquid to expand, thereby expanding bellows 9 and causing upward movement of rod 7 until the switch 15, 16 is actuated to open the circuit of winding 14. As soon as the latter happens, heating of the liquid discontinues and the liquid is allowed to cool so as to permit the spring 10' to collapse the bellows 9 and move the rod 7 downwardly. Downward movement of rod 7 actuates the switch 15, 16 so as to again close the circuit of winding 14. This cycle of operation continues as long as switch 20 is closed.

As shown more clearly in Fig. 4, the rod 7 may have an elongated longitudinal slot 21 through which reduced ends of the pins 19 extend, said reduced ends having nuts 22 threaded thereon so as to secure the pins 19 in different positions of adjustment.

Both forms of the invention are alike except that, in the form of Figure 1, the rod 7 is formed with rack teeth 23 meshing with the teeth of a spur gear or gear segment 24 suitably journaled in the upper portion of casing 5. Also, a second rod 25 slidably extends through a side of casing 5 at the top of the latter and is provided at its inner end with rack teeth 26 also meshing with the teeth of gear or gear segment 24. It will thus be evident that the form of the invention shown in Figure 1 is utilized where horizontal movement of the actuated device is required, said device being operatively connected to rod 25. On the other hand, the form of Figure 3 is used where vertical movement of the actuated device is required, such device being connected to the upper end of rod 7.

From the foregoing description, it is believed that the construction, operation and advantages of the present invention will be readily understood and appreciated by those skilled in the art. Further modifications and minor changes in details of construction are contemplated, such as fairly fall within the scope of the invention as claimed.

What I claim is:

In an electrically heated bellows motor, a vertical upwardly expansible liquid containing bellows, a vertically reciprocable rod connected at its lower end to the top of said bellows and adapted to be operatively connected to a device to be operated, spaced guides for said rod, an electrical heater for the liquid in said bellows, said rod having a longitudinal elongated slot, spaced pins carried by and projecting laterally from said rod, said pins having reduced ends extending through said slot and having nuts threaded thereon to secure the pins in different positions of adjustment longitudinally of the rod and relative to each other, a bellcrank lever pivotally mounted adjacent the rod and having one arm extending upwardly and another arm projecting between and in the path of said pins, and a mercury switch fixed to said one arm and connected in circuit with said heater for rendering said heater inoperative and operative respectively upon predetermined expansion and predetermined contraction of said bellows.

GEORGE C. MOLOTZAK.

REFERENCES CITED

The following references are of record in the file of this patent:

UNITED STATES PATENTS

| Number | Name | Date |
|---|---|---|
| 652,601 | Dodds | June 26, 1900 |
| 1,402,021 | Snelling | Jan. 3, 1922 |
| 1,414,448 | Windell | May 2, 1922 |
| 1,603,593 | Goodhue et al. | Oct. 19, 1926 |
| 1,942,040 | Wolff | Jan. 2, 1934 |
| 2,054,205 | Palmer | Sept. 15, 1936 |
| 2,060,039 | Clapp | Nov. 10, 1936 |
| 2,433,493 | Turner | Dec. 30, 1947 |